United States Patent [19]
Kessler

[11] 3,963,878
[45] June 15, 1976

[54] SIGNAL INTERPRETING SYSTEM FOR FREQUENCY SELECTIVE MULTIFREQUENCY TONE DIALING

[75] Inventor: Arthur Kessler, Koppern, Germany

[73] Assignee: Telefonbau und Normalzeid G.m.b.H., Frankfurt am Main, Germany

[22] Filed: June 26, 1974

[21] Appl. No.: 483,470

[30] Foreign Application Priority Data
July 6, 1973    Germany.............................. 2334426

[52] U.S. Cl. .......................................... 179/84 VF
[51] Int. Cl.²......................................... H04M 1/50
[58] Field of Search....................... 179/84 R, 84 VF

[56] References Cited
UNITED STATES PATENTS

| | | | |
|---|---|---|---|
| 3,128,349 | 4/1964 | Boesch ........................... | 179/84 VF |
| 3,140,357 | 7/1964 | Bischof........................... | 179/84 VF |
| 3,288,940 | 11/1966 | Bennett .......................... | 179/84 VF |
| 3,299,216 | 1/1967 | Beyerle........................... | 179/84 VF |
| 3,582,562 | 6/1971 | Sellari............................. | 179/18 AD |
| 3,686,440 | 8/1972 | Kroeger .......................... | 179/5.5 |

*Primary Examiner*—Kathleen H. Claffy
*Assistant Examiner*—Joseph Popek
*Attorney, Agent, or Firm*—Erwin Salzer

[57] ABSTRACT

A signal interpreting system for frequency-selective multi-frequency tone dialing includes a code tester and a code converter, and two serially connected delay means processing the output of said code tester and having an output controlling logic circuitry arranged in the output circuits of said code converter.

3 Claims, 3 Drawing Figures

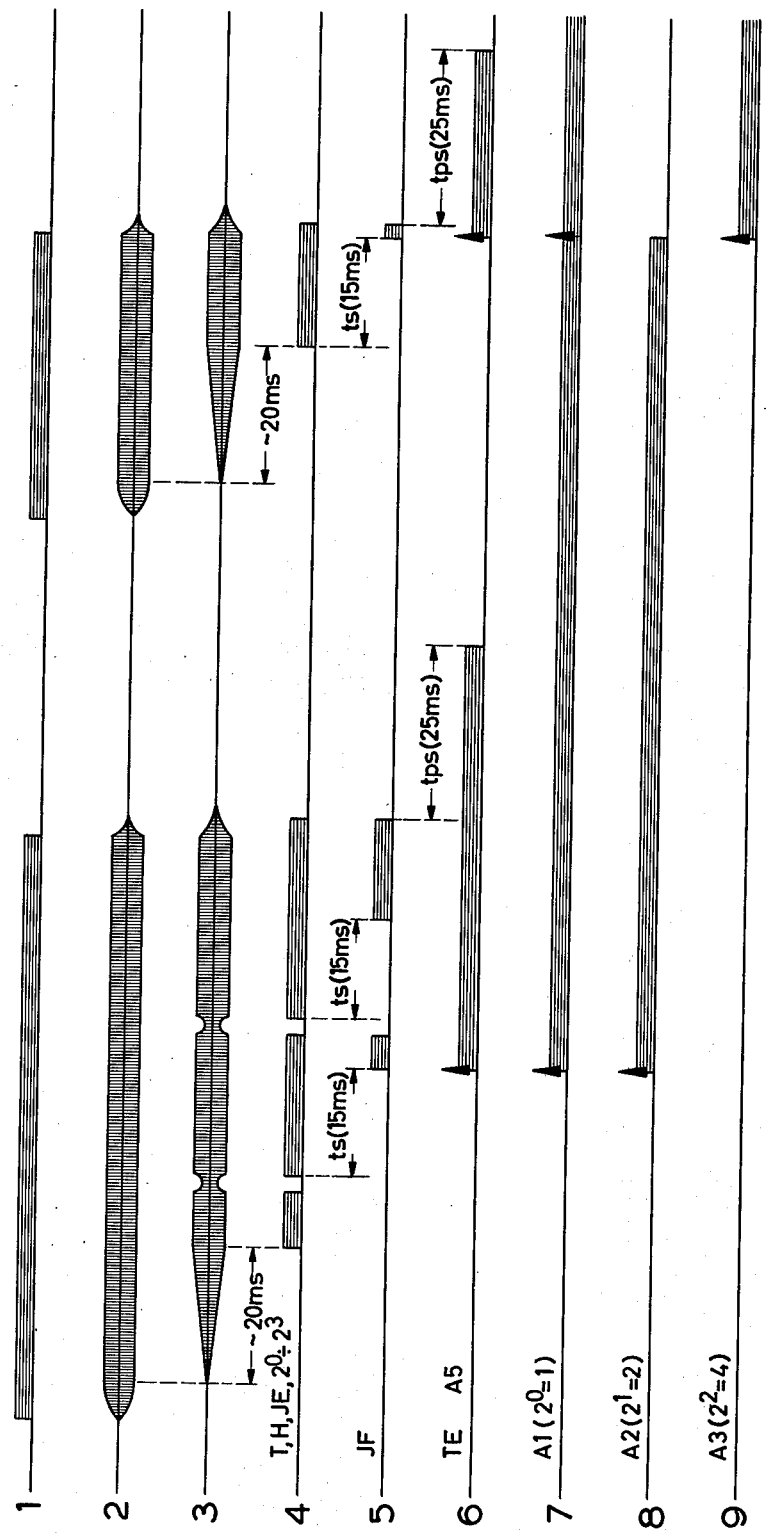

SIGNAL INTERPRETING SYSTEM FOR FREQUENCY SELECTIVE MULTIFREQUENCY TONE DIALING

BACKGROUND OF THE INVENTION

This invention relates to signal interpretation for selective signal receivers for so called key pulsing, a form of pushbutton calling using multifrequency (MF) tones. It is particularly intended to be used in connection with telephone systems using multifrequency tone keying and having receivers coded in a 2 × 1-out-of-4 signal code, and code converters converting said code into another code, such as BCD code.

Systems of this nature are best known as Touch Tone dialing, which is a proprietory term of the Bell System.

In pushbutton dialing systems receivers must detect the frequencies transmitted by the subscriber stations, store the same, and convert the same into d-c signals capable of being processed by central stations. In addition thereto, the aforementioned receivers must be capable of distinguishing with an utmost degree of certainty dialing signals in the voice frequency range from speech signals, and from disturbances.

The requirements imposed upon the circuitry which tests the multifrequency signals converted into direct-current pulses, changes the code thereof if necessary, or desirable, and transmits the called numbers to a storage register in the office vary widely.

For best protection of dialing signals against signals resulting from speech the signal interpreting circuitry must test whether or not two, and only two, frequencies are transmitted uninterruptedly during a predetermined period of time. Another requirement consists in that dialing signals of long duration are not twice evaluated, even in case that such signals are interrupted for short times, e.g. by a fault condition. A further requirement consists in that the point of time at which a particular dialing key is released be detected with a high degree of certainty, even in case of short changes of the voltage level of the line, due to some disturbances. The duration of the incoming dialing signals depends upon the duration the dialing keys are depressed, and thus subject to large variations. The shortest signals transmitted from a pushbutton dialing subscriber must be detected with certainty by the voice frequency receiver, yet in the interest of protection against speech-generated signals the receivers must have relatively extended periods available for evaluating the signals which are received by them. The duration of signals at the output of the receiver must last from a few milliseconds to several hundred milliseconds, depending upon the time the dialing keys are depressed. In order to achieve safe transmission even if the time of the operation of dialing keys is very short, it is desirable to extend the period during which the signal interpreting circuitry has an output beyond the period of actuation of the respective dialing key. Key dialing receivers are often centrally located, and are related to the calling subscriber and to the storage register of the telephone system only as the need arises. Therefore, the number of the outgoing lines of the signal interpreting circuitry should be minimized. It is desirable not to provide 8 outgoing lines which correspond to the 8 voice frequencies, or to provide 16 outgoing lines of which each corresponds to one of the 16 possible dialing signals, but to provide the signal interpreting unit with a converter for converting the dialing signals into BCD(binary coded decimal) signals, thus allowing to limit the number of outgoing lines to 4.

The technology of MF key dialing is well known in the art, in particular by the recommendations of the CCITT (International Telephone and Telephone Consultive Committee of the International Telecommunications Union). Hence the MF key dialing technology will be discussed hereinafter only to such extent as required for a complete understanding of the dial signal interpreting circuitry embodying the present invention. MF key dialing transmitters produce upon operation of each of the keys of a keyboard simultaneously two frequencies in the audible range. Each of these two frequencies pertains to one of two bands of frequencies, each such band including four frequencies. The MF receivers separate the low-band frequencies and the high-band frequencies by band-pass filters and by band-rejection or band-stop filters, and supply the separated frequencies to four tuned or selective receivers. A code tester ascertains that in transmitting a dial number one and only one frequency of each band of frequencies is simultaneously involved. Both frequencies must be received uninterruptedly for a predetermined period of time. If this protective period of time is not maintained, the receiver is reset and the transmission of dialing signals does not take place. This precludes transmission to the central station or exchange of dial-signal-simulating disturbances as, for instance, speech, switching of click noise, etc. In some systems resetting also occurs when noise frequencies occur in addition to the useful dialing frequencies tending to impair a correct evaluation or interpretation of the dial tones which are received.

Prior art MF dialing systems attempted with limited success to eliminate the effects of disturbances upon the proper transmission of dial information. The present invention is an improvement over prior art MF dialing systems and its main object is to preclude, or reduce, multiple interpretation and/or suppression of dial numbers. Short time reductions of the line voltage have little or no effect upon the effectiveness of the system.

SUMMARY OF THE INVENTION

A signal interpreting system embodying this invention for frequency-selective multifrequency tone dialing includes a code tester and a code converter having inputs supplied with signals from signal receivers during the times of reception of said signal receivers of resonant frequencies. Systems embodying this invention further include a first time delay means supplied with an output voltage from said code tester for the duration of said signals in presence of a correct code, said first delay means having output signals delayed for fixed predetermined periods of time. Systems embodying this invention further include second time delay means whose input are said output signals of said first time delay means. Said second time delay means have output signals which start instantly with any input and terminate after a fixed period of time following cessation of said output signals of said first time delay means. Systems embodying this invention further include a plurality of bistable logic elements supplied with coded information from output terminals of said code converter and under the control of said output signals of said second time delay means so as to instantly release at output terminals thereof said coded information in response to said output signals of said second time delay means. Systems embodying this invention further include a transmission line connected to an output terminal of said second time delay means for transmitting said output signals thereof along said transmission line.

BRIEF DESCRIPTION OF THE DRAWINGS

FIG. 3 shows in lines 1 to 9 thereof time signal diagrams which appear at the points of the circuitry of FIG. 1 which are designated in that figure by the same reference character as the respective line of FIG. 3, and FIG. 3 refers more particularly to sequential transmission of the numbers 3 and 5 in a system embodying this invention.

DESCRIPTION OF PREFERRED EMBODIMENTS

Figure 1:
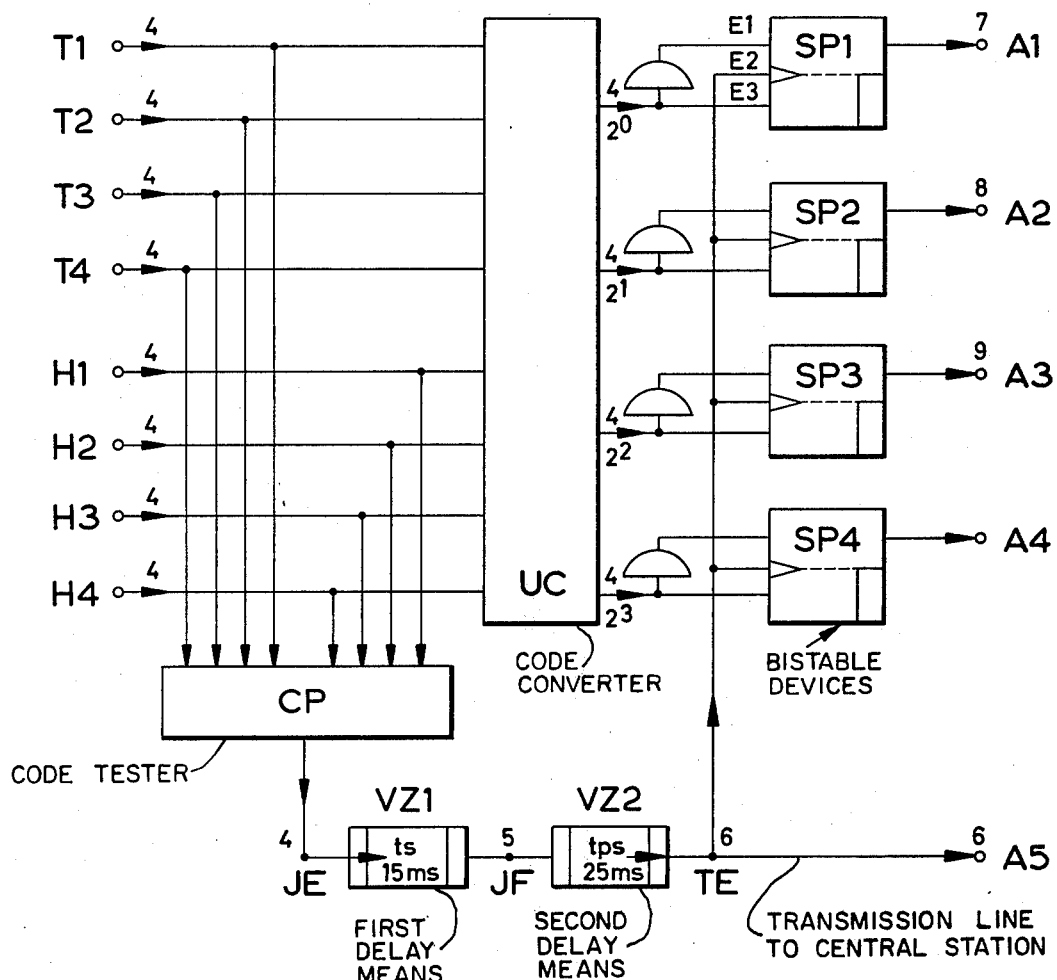
FIG. 1 is a block diagram of a signal interpreting system embodying this invention having an ultimate BCD output.

Referring now to the drawings, FIG. 1 shows merely those units which are necessary for an understanding of the present invention. Filters, limiters and amplifiers have been deleted in FIG. 1. The signal interpreting circuitry begins with the incoming lines T1 to T4 and H1 to H4. Lines T1 to T4 carry frequencies pertaining to a first group or band of low frequencies, and lines H1 to H4 carry frequencies pertaining to a second group or band of high frequencies. The differences of potential appearing on the aforementioned lines T1 to T4, and H1 and H4, are those of the audible frequency receivers (not shown) of the group or band of low frequencies and that of high frequencies. Reference characters A1 to A5 have been applied to indicate five outgoing lines of the system. The called numbers are received in what is often termed the touch-tone code, also referred-to as pushbutton code, or key code, since touch-tone is a trademark of the Bell System. The outgoing lines A1 to A4 of the signal interpreting circuitry carry the called numbers in BCD format in which they are transmitted by appropriate coupling or transmission means to the register of the telephone system. The outgoing line A5 informs the register of the presence of a new number and delays the end of key pressure.

Assuming that a calling subscriber at the remote end of the line depresses the key number 3 for the period of time indicated in line 1 of FIG. 3. As a result, the transmitters in the key or pushbutton selector produce the trains of oscillations shown in line 2 of FIG. 3. According to CCITT code 2 × 1-out-of-4 signal code the line carries simultaneously the frequencies of 697 Hz and 1477 Hz. The audio receivers (not shown) tuned to these frequencies oscillate and interrupt their oscillations as indicated in line 3 of FIG. 3 and supply the incoming lines T1 and H3 with signals to be interpreted shown in line 4 of FIG. 3 as d-c pulses. The code tester CP shown in FIG. 1 determines that one, and only one, frequency of each frequency group is received. In the affirmative, unit CP transmits these voltages—JE of line 4 of FIG. 3—instantly to the delay line VZ1 also shown in FIG. 1. Delay line VZ1 has a delay time of, for instance, 15 ms as a result of which a voltage pulse received by delay line VZ1 is subsequently, or 15 ms later, received by the serially arranged delay device VZ2, unless—as shown at the beginning of lines 4 and 5 of FIG. 3—prior to the termination of the delay period of, e.g. 15 ms, the voltage level at the signal receiver undergoes a short time reduction. In that instance delay line VZ1 returns instantly to its initial state, and produces only 15 ms after the return of the voltage JE to normal the output voltage JF, as shown on line 5 of FIG. 3. Simultaneously with the appearance of the voltage pulse JF, a voltage pulse TE appears at the output of delay device VZ2. This has been indicated in FIG. 1 and the voltage pulse TE has been shown in line 6 of FIG. 3. The arrow in line 6 of FIG. 3 indicates the steeply rising leading edge of voltage pulse TE. In FIG. 1 reference characters SP1,SP2,SP3,SP4 have been applied to indicate four bistable storage logic elements having dynamic inputs E2. The aforementioned steep leading edge of pulse TE causes a change of state of elements or flip-flops SP1,SP2,SP3,SP4. As a result, the four outputs A1,A2,A3,A4 of flip-flop SP1,SP2,SP3,SP4 assume the voltages which correspond to their previously set inputs E1 and E3. In the specific example under consideration, i.e. transmittal of the FIG. 3, only the BCD outputs of $2^0=1$ and $2^1=2$ of the code converter UC carry a voltage. This voltage is supplied to the inputs E3 of flip-flops SP1 to SP4 and, upon being inverted, also supplied to the inputs E1 of flip-flops SP1 to SP4. These voltages appear at the outputs A1 and A2 of flip-flops SP1 and SP2 as shown in lines 7 and 8 of FIG. 3. No output voltage appears at the outputs A3 and A4 of bistable devices or flip-flops SP3 and SP4.

The pulse TE for controlling flip-flops SP1 to SP4 with its steep leading edge appears also at the output A5, and forms a control signal which, when transmitted by a transmission line connected to output A5 to the register of the system, informs the register that new numbers may be received from output terminals A1 to A4. The voltage signal TE restores delay line VZ2 to its original state only after a predetermined disconnecting delay period *tps* which, for instance, may be 25 ms following zero of the voltage pulse JF. This has been shown in lines 5 and 6 of FIG. 3. Since the total time of the second disturbance lasting less than 10 ms (see lines 3 and 4 of FIG. 3) plus the delay time *ts* (see line 5 of FIG. 3) is less than the time *tps*, the second disturbance has no consequence, and the signal voltage TE drops to zero only about 25 ms upon release of pressure upon the dialing key. This is apparent from line 6 of FIG. 3. The trailing edge of this signal voltage has no effect upon storage means SP1 to SP4, i.e. the voltages of outputs A1 and A2 remain unchanged at least to the time of the next rise of the voltage TE (see lines 7 and 8 of FIG. 3). It will thus be apparent that disturbances as, for instance, the second short decline of the voltage level, do not result in a change or a repetition of the interpretation of the signal.

The right side of the diagrammatic representation of FIG. 3 shows the effects of another depression of one of the dialing keys, namely that of actuating key number 5. The time of key depression is about 40 ms and so short that after a build-up time of the line of about 20 ms and a protective period *ts* of 15 ms there remains an impulse time JF (see line 5 of FIG. 3) of but a few msec. In order to secure proper signal interpretation delay element VZ2 prolongs that impulse for a period of time *tps*, or 25 ms, as shown in line 6 of FIG. 3.

According to the recommendations of the CCITT the number 5 is formed by the second frequency (770 Hz) of the group or band of lower frequencies and by the second frequency (1336 Hz) of the group or band of upper frequencies. Hence signal interpreting inputs T2 and H2 carry voltages which are converted by the code converter UC into outputs $2^0=1$ and $2^2=4$. Since output $2^0$ carried a voltage when number 3 was transmitted, the voltages of set terminals E1 and E3 of storage device of flip-flop SP1 remain unchanged — as shown on line 7 of FIG. 3 — and, therefore, also the voltage at the output A1 when the storage devices SP1 to SP4 are reset by the leading edge of the signal voltage TE (see line 6 of FIG.3). As this leading edge appears, the voltage heretofore prevailing at the output A2 disappears, as shown in line 8 of FIG. 3, and reset storage device SP3 exhibits a voltage at its output A3 shown in line 9 of FIG. 3.

The voltage that appears simultaneously at the signal output terminal A5 which lasts at least 25 ms (see line 6 of FIG. 5) informs the register of the central station that the code transmitting lines carrying the outputs A1 to A4 now transmit another dial number. The register may accept the number immediately and transmit an acknowledgement signal back to the dial receiver to the effect that — irrespective of the subsequent duration of the pressure exerted upon a dialing key, the dial receiver is not needed any longer, and its bistable storage means may be reset, or cancelled. As an alternative, the register may scan the transmitted dial number in the period of time available up to the next change of signal. Depending upon selection of either of these alternatives, the holding time and the number of required tone receivers and signal interpreting and interrogating means may change.

Figure 2:
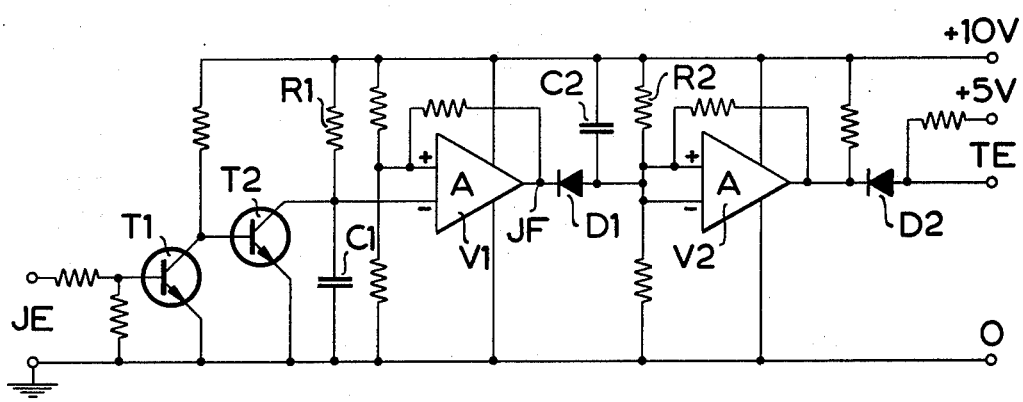
FIG. 2 is a circuit diagram of the time delay means shown in FIG. 1 in block form which time delay means include operational amplifiers.

Referring now more specifically to FIG. 2, this figure shows in more detail the time delay means VZ1 and VZ2 of FIG. 1, and the operational amplifiers forming a part thereof. If the code tester CP (FIG. 1) supplies a high input voltage JE to the terminals shown to the left of FIG. 2, a base current flows through transistor T1. This current removes the short across capacitor C1 by the collector-emitter circuit of transistor T2. Hence capacitor C1 starts to be charged through resistor R1. Capacitor C1 reaches the positive voltage determined by the position of a potentiometer connected to the positive input terminal of operational amplifier V1 within a time $T1=R1·C1$ ($ts=15$ ms). Then the output voltage JF which had previously been positive drops suddenly to 0. As a result, capacitor C2 is suddenly charged 10 volt by way of diode D1, the voltage at the negative input of amplifier V2 changes from plus 10 volt to 0, and the output voltage of amplifier V2 rises simultaneously from 0 to plus 10 volt. The current which had flowed heretofore from the plus 5 volt terminal by way of diode D2 and the output terminal of the amplifier V2 to 0 is interrupted by diode D2, and the voltage at the terminal TE rises from 0 to to plus 5 volt. This voltage remains unchanged upon reversal of the output voltage of amplifier V1 from 0 to plus 10 volts as long as the charge of capacitor C2 being discharged by way of resistor R2 exceeds the voltage which is applied to the positive input of amplifier V2 by a fixedly adjusted potentiometer.

The time of discharge $tps=R2·C2$ terminates at about 25 ms, and then the voltage at the negative input of amplifier V2 exceeds that at the positive input, and the output voltage of amplifier V2 changes again from plus 10 volt to 0, a change which is accelerated by the positive feed-back of the amplifier. Therefore the terminal voltage TE drops likewise from plus 5 volt to 0.

The times relating to the delay means VZ1 and VZ2 are given only by way of example, and depend upon the prevailing conditions of signal evaluation. It the period of protection ts is relatively long, this enhances protection against disturbances by voice transmission, but it reduces the times required for recognition of frequency, and consequently the number of frequencies that can be recognized per unit of time. This is so since the time $tsp$ must exceed the longest interruptions of signals that may occur by the time of the periods of protection ts. If this condition were not met, too long key-depressing times might result in plural signal recognition.

I claim as my invention:

1. A signal interpreting system for frequency-selective multifrequency tone dialing including
    a. a code tester (CP) for determining that one and only one frequency of each of two frequency groups is received and a code converter (UC) for converting signals received in a 2×1-out-of-4 signal code into another code, said code tester and said code converter having inputs T1 to T4 and H1 to H4) supplied with signals from signal receivers during the times of reception by said signal receivers of resonant frequencies;
    b. a first delay means (VZ1) supplied with an output voltage (JE) from said code tester for the duration of said signals if in a correct 2×1-out-of-4 code, said first delay means having output signals (JF) delayed for fixed predetermined periods of time (ts), and said first delay means being adapted to delay only the leading edges of said output signals thereof relative to the leading edges of said output voltage of said code tester and to transmit the trailing edges of said output voltage of said code code tester without delay;
    c. a second delay means (VZ2) whose input are said output signals (JF) of said first time delay means (VZ1), said second time delay means having output signals (TE) which start instantly with any input and terminate after a fixed period of time (tps) following cessation of said output signals (JF) of said first time delay means (VZ1), said second time delay means being adapted to transmit the leading edge of said output of said first time delay means without time delay and to transmit the trailing edge of said output of said first time delay means with time delay;
    d. a plurality of bistable logic elements (SP1 to SP4) supplied with de-coded information from output terminals ($2^0$, $2^1$, $2^1$, $2^3$) of said code converter (UC), each of said plurality of bistable logic elements having a dynamic input (E2) supplied by said output signals (TE) of said second time delay means (VZ2) and said plurality of bistable logic elements having output terminals (A1–A4) where the inputs thereof remain normally stored and released only in response to the leading edge voltage of said output signals of said second time delay means; and
    e. a transmission line connected to an output terminal (A5) of said second time delay means (ZV2) for transmitting said output signals (TE) thereof along said transmission line to a central station.

2. A system as specified in claim 1 wherein each of said plurality of bistable logic elements (SP1 to SP4) has inputs (E1,E3) connected to said output terminals ($2^0$, $2^1$, $2^2$, $2^3$) of said code converter (UC), and wherein each of said plurality of bistable logic elements has a dynamic input (E2) supplied by said output signals (TE) of said second time delay means (VZ2), so that the voltages at said output terminals (A1–A4) of said plurality of bistable logic elements corresponding to the voltages set as said inputs (E1,E3) of each of said plurality of bistable logic elements (SP1 to SP4) remain normally stored and released only in response to leading edge voltages of said output signals (TE) of said second time delay means (VZ2).

3. A system as specified in claim 1 wherein said first time delay means (VZ1) and said second time delay means (VZ2) include resistor-capacitor coupled operational amplifiers (V1,V2) for producing the time delays ($t_s$,$t_{ps}$) thereof.

* * * * *